United States Patent [19]

Wakalopulos et al.

[11] Patent Number: 4,558,450
[45] Date of Patent: Dec. 10, 1985

[54] CATHODE BLEED ARRANGEMENT FOR ELECTRICALLY EXCITED FLOWING GAS LASERS

[76] Inventors: George Wakalopulos, 16832 Charmel La., Pacific Palisades, Calif. 90272; Robert A. Hill, 6979 Trolley Way, Playa Del Rey, Calif. 90291; Eugene R. Peressini, 5021 Browndeer La., Palos Verdes Peninsula, Calif. 90274

[21] Appl. No.: 363,317

[22] Filed: Mar. 29, 1982

Related U.S. Application Data

[63] Continuation of Ser. No. 62,858, Jul. 31, 1979.

[51] Int. Cl.⁴ ............................................. H01S 3/097
[52] U.S. Cl. ........................................ 372/87; 372/60; 372/74; 372/58
[58] Field of Search ....................... 372/81, 74, 61, 83, 372/85, 87, 58, 59, 60

[56] References Cited

U.S. PATENT DOCUMENTS

| | | | |
|---|---|---|---|
| 3,808,551 | 4/1974 | Ahouse | 372/74 |
| 3,842,366 | 10/1974 | Gordon et al. | 372/83 |
| 4,024,465 | 5/1977 | Farish et al. | 372/81 |
| 4,152,672 | 5/1979 | Hundstad | 372/83 |

OTHER PUBLICATIONS

"HF and DF Lasers by Direct Electrical Discharge Excitation", Byron et al., App. Phys. Lett., vol. 23, No. 10, Nov. 15, 1973.

Primary Examiner—William L. Sikes
Assistant Examiner—Léon Scott, Jr.

[57] ABSTRACT

A high power, electrically excited laser is disclosed wherein a laser gas is caused to flow through an excitation region in which an electric discharge is established along a direction transverse to the direction of flow of the laser gas between an anode and a porous cathode disposed on opposite sides of the excitation region, and wherein an electron beam is introduced into the excitation region along a direction parallel to the direction of the discharge. A first quantity of an auxiliary gas (preferably helium) having a normal glow current density at least an order of magnitude less than that of the laser gas is introduced into the upstream end of the excitation region adjacent to the cathode and caused to flow across the cathode surface along a direction parallel to that of the laser gas. A second quantity of the auxiliary gas is "bled" through the porous cathode and gradually added to the auxiliary gas stream flowing across the cathode surface. The auxiliary gas is removed from the laser at the downstream end of the excitation region.

14 Claims, 1 Drawing Figure

U.S. Patent  Dec. 10, 1985  4,558,450
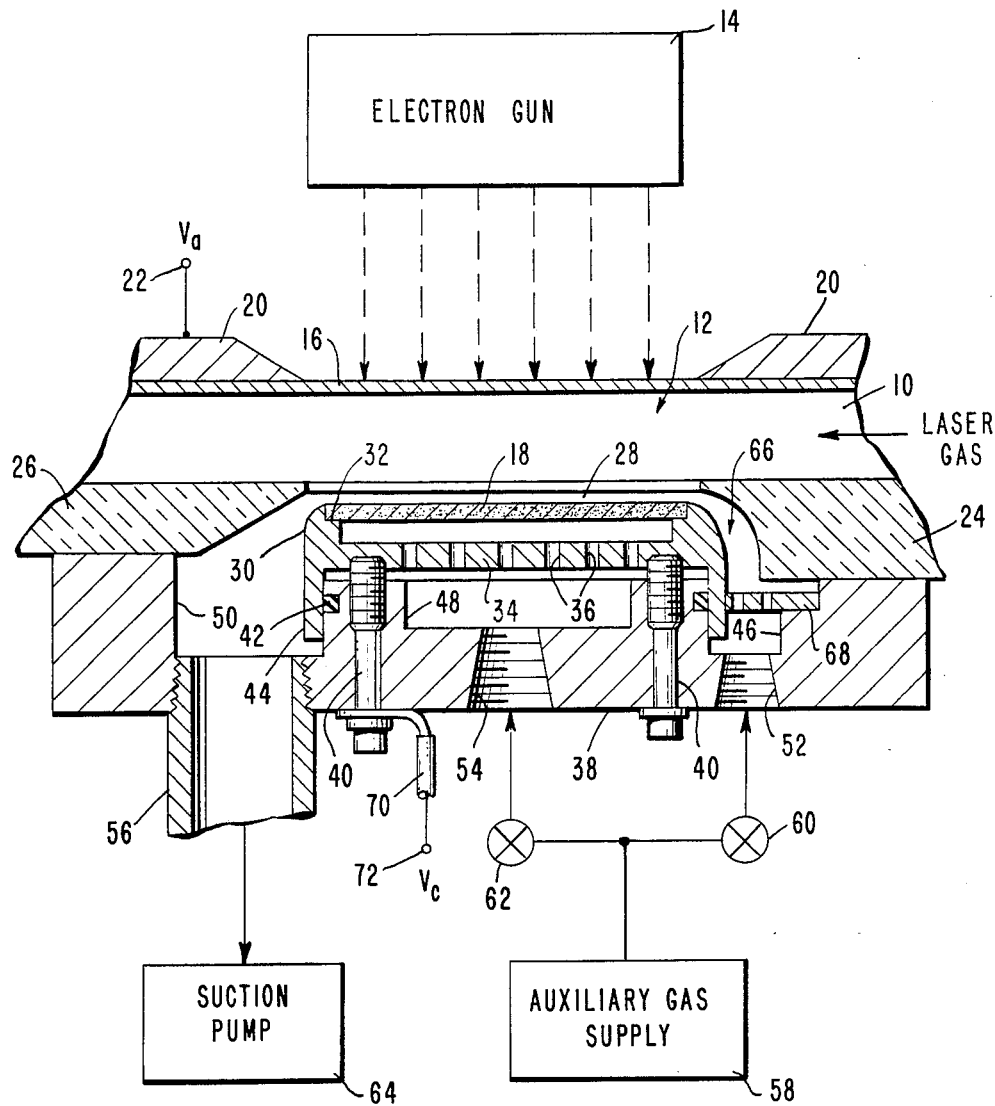

CATHODE BLEED ARRANGEMENT FOR ELECTRICALLY EXCITED FLOWING GAS LASERS

This is a continuation of application Ser. No. 062,858, filed July 31, 1979.

TECHNICAL FIELD

This invention relates to lasers, and more particularly it relates to flowing gas lasers excited by means of an electric discharge transverse to the gas flow direction.

BACKGROUND ART

Exemplary high power, cw, electrically excited flowing gas lasers are disclosed in U.S. Pat. No. 3,962,656 to E. R. Peressini and in U.S. Pat. No. 3,970,962 to E. R. Peressini et al, both patents being assigned to the assignee of the present invention. In lasers of this type, the laser gas flows through an excitation region where it is excited to a condition of population inversion by an electric discharge controlled by an electron beam introduced into the excitation region from an adjacent electron gun. The discharge is established between an anode and a cathode disposed on opposite sides of the gas flow channel at the excitation region. The electrons in the electron beam and in the discharge current travel in a direction transverse to the glas flow direction.

It is sometimes desirable to operate lasers of the foregoing type at laser gas pressures approaching or even exceeding atmospheric pressure in the excitation region. When operating at such pressures, as the power level is increased it becomes more difficult to maintain a uniform, homogeneous discharge in the region adjacent to the cathode. Eventually, a limit is imposed on the power level at which the laser may be reliably operated.

In high pressure chemical lasers utilizing an electric discharge transverse to a flowing gas mixture, the stability and uniformity of the discharge have been improved by introducing a pair of auxiliary gas streams into the flowing gas mixture upstream from the discharge region and by causing these streams to flow through the discharge region immediately adjacent to the respective discharge electrodes. Ionization in the auxiliary gas streams produces a sufficient number of electrons to effectively provide "plasma electrodes" adjacent to the actual discharge electrodes. These plasma electrodes reduce the electric field near the electrode surfaces. A specific exemplary chemical laser which employs auxiliary gas streams (consisting of a mixture of He and $SF_6$) in the aforedescribed manner is disclosed in the Final Technical Report—Phase I under Contract DAAH01-75-C-0412 entitled "High Pressure CW Chemical Laser," by David Wrench, Hughes Research Laboratories, November 1976, particularly at pages 22, 29, 32 and 33.

When employing an auxiliary gas stream arrangement of the aforedescribed type, great care must be taken to properly match the velocities of the auxiliary and the laser gas streams or excessive mixing of the auxiliary and the laser gases will occur. Moreover, even with optimum velocity matching, sufficient gas mixing occurs so that the effectiveness of the auxiliary gas streams is reduced in the downstream region of the discharge.

SUMMARY OF THE INVENTION

It is an object of the present invention to provide an electric discharge-excited flowing gas laser capable of operating at higher power levels than in the past while maintaining excellent discharge uniformity and stability.

It is a further object of the invention to provide a high power, high pressure, electric discharge-excited flowing gas laser in which any tendency for spurious oscillations due to "hot spots" in the discharge is minimized.

It is still another object of the invention to provide a cathode arrangement for lasers of the foregoing type in which a discharge uniformity enhancing auxiliary gas stream is caused to flow across the cathode surface, and which arrangement is insensitive to the length and velocity of the auxiliary gas stream.

In a laser according to the invention, a laser gas is caused to flow through an excitation region in which an electric discharge is established along a direction transverse to the direction of flow of the laser gas between an anode and a cathode disposed on opposite sides of the excitation region, and into which region an electron beam is introduced along a direction parallel to the discharge direction. In accordance with the invention, the cathode includes a porous member of electrically conductive material having a broad surface facing the anode. A first quantity of an auxiliary gas having a normal glow current density substantially different from that of the laser gas is introduced into the upstream end of the excitation region with respect to the laser gas at a location adjacent to the broad surface of the porous member, and this auxiliary gas is directed into a flow path across the broad surface of the porous member along a direction parallel to the flow direction of the laser gas. A second quantity of the aforementioned auxiliary gas is "bled" through the porous member and gradually added to the auxiliary gas stream flowing across the broad surface of the porous member. The auxiliary gas is removed from the laser at the downstream end of the excitation region.

Additional objects, advantages, and characteristic features of the invention will become apparent from the following detailed description of a preferred embodiment of the invention when considered in conjunction with the accompanying drawing.

BRIEF DESCRIPTION OF THE DRAWING

In the accompanying drawing the single FIGURE is a sectional view, partly in schematic form, illustrating the excitation region of an electrically excited flowing gas laser incorporating a cathode arrangement according to the invention.

DETAILED DESCRIPTION OF THE INVENTION

Referring to the FIGURE with greater particularity, there is shown a laser gas flow channel 10, which may have a rectangular cross-section, including an excitation region 12 in which a laser-exciting electric discharge is established. The laser gas may be supplied to the channel 10 from a well-known arrangement (not shown) including a plenum chamber for storing the laser gas at high pressure and a nozzle for accelerating the gas stored in the plenum chamber into a high-velocity flowing gas stream which arrives at the excitation region 12 with the desired velocity and gas pressure for achieving efficient laser operation. An arrangement according to the present invention is especially suitable for lasers wherein the pressure of the laser gas in the excitation region 12 is about one atmosphere. An exemplary plenum chamber-nozzle gas supply arrangement which may be employed for such a laser is disclosed in detail in the aforementioned U.S. Pat. Nos. 3,962,656 and 3,970,962. An example of a specific laser gas which may be employed is a mixture of helium, nitrogen, and carbon dioxide in a volume ratio of approximately 8:7:1, although it should be understood that other gases and gas mixture ratios may be employed instead.

In the excitation region 12 the laser gas is excited to a condition of population inversion by a cw electric discharge along a direction transverse to the gas flow direction and controlled by an electron beam generated by an electron gun 14 disposed adjacent to the excitation region 12 and introduced into the region 12 along a direction parallel to the discharge direction. Specific exemplary electron guns which may be employed for the electron gun 14 are disclosed in detail in the aforementioned U.S. Pat. Nos. 3,962,656 and 3,970,962. The electric discharge is established between an anode 16 disposed on one side of the excitation region 12 and a porous cathode member 18 disposed on the opposite side of the region 12. The anode 16, which may take the form of a foil window for the electron gun 14, is mounted on an electrically conductive support member 20. By utilizing an anode 16 which also serves as a foil window for the electron gun 14, electrons from the gun 14 are able to enter the excitation region 12 with a desired velocity and, at the same time, an appropriate pressure differential may be maintained between the region 12 and the interior of the electron gun 14. In order to apply a desired dc operating voltage $V_a$ (which may be ground, for example) to the anode 16, the anode support member 20 may be electrically connected to an appropriate power supply terminal 22 which furnishes the voltage $V_a$.

Disposed on the opposite side of the gas flow channel 10 from the anode 16 are a pair of wall members 24 and 26 of electrically insulating material, such as alumina ceramic. The wall members 24 and 26 terminate at the respective upstream and downstream extremities of the excitation region 12 so that the porous cathode member 18 is exposed to anode 16 at the region penetrated by the electron beam from the gun 14. Moreover, the surface of the cathode member 18 facing the anode 16 is laterally offset from the gas flow channel walls defined by the members 24 and 26 such that the gas flow channel 10 is widened in the excitation region 12 to include an auxiliary gas flow portion 28 immediately adjacent to the cathode member 18 between the downstream extremity of the wall member 24 and the upstream extremity of the wall member 26.

The cathode member 18, which may be of porous bronze, for example, is mounted on a support member 30 which may be of aluminum or stainless steel, for example. The support member 30 has a flanged portion 32 along its perimeter which projects toward the laser excitation region 12 and which supports the perimeter of the porous cathode member 18. The support member 30 also has a plate-like portion 34 disposed parallel to and spaced from the cathode member 18. The plate-like portion 34 of the support member 30 defines a plurality of holes 36 providing gas flow passages therethrough.

The cathode support member 30 may be mounted on a base member 38, which may be of a metal such as stainless steel or aluminum, and which also may be attached to the gas flow channel wall members 24 and 26. The cathode support member 30 may be secured to the base member 38 by means of a plurality of screws or bolts 40, for example, to facilitate fine adjustment of the location of the porous cathode member 18. A pressure seal may be provided between the cathode support member 30 and the base member 38 by means of an O-ring 42 mounted in a groove in the base portion 38 adjacent to a flange 44 on the cathode support member 30 which projects away from the laser excitation region 12 along the perimeter of the member 30.

The base member 38 is provided with a first recess 46 adjacent to the downstream end of the gas flow channel wall member 24, a second recess 48 adjacent to the side of the plate-like portion 34 remote from the porous cathode member 18, and a third recess 50 adjacent to the upstream end of the channel wall member 26. Auxiliary gas entrance passages 52 and 54 are provided in the base member 38 in gas flow communication with the respective recesses 46 and 48, while an auxiliary gas exhaust tube 56 is attached to the base member 38 in gas flow communication with the recess 50. An auxiliary gas to be described in more detail below is fed to the entrance passages 52 and 54 from an auxiliary gas supply 58, with control valves 60 and 62 being included in the gas feed lines between the gas supply 58 and respective passages 52 and 54 to regulate the quantities of gas introduced into the passages 52 and 54. A suction pump 64 is connected to the exhaust tube 56 to remove spent auxiliary gas from the laser excitation region 12 via the exhaust tube 56 at a mass flow rate substantially the same as that at which the auxiliary gas is introduced into the excitation region 12.

Opposing surfaces of the gas flow channel wall member 24 and the cathode support member 30 between the recess 46 and the auxiliary gas flow channel 28 are appropriately curved and made slightly converging to provide an elbow nozzle 66 for accelerating the auxiliary gas being introduced into the laser excitation region 12 and directing it into a stream flowing across the surface of porous cathode member 18 along the channel 28. In addition, a flow-smoothing apertured plate 68 may be disposed across the auxiliary gas flow path between the recess 46 and the elbow nozzle 66.

Electrical connection to the cathode member 18 may be afforded by connecting an electrical conductor such as high voltage cable 70 to one of the bolts 40 that engage the cathode support member 30. Cable 70, in turn, may be electrically connected to a power supply terminal 72 which furnishes a desired dc operating voltage $V_c$ for the cathode 18.

In order to enable the generation of a laser beam long an optical axis perpendicular to both the laser gas flow and the discharge direction, i.e., along an axis perpendicular to the plane of the FIGURE, an optical resonator may be provided along such axis consisting of a pair of aligned mirrors (not shown) disposed beyond the opposite ends of the excitation region 12 along the optical axis.

In a cathode arrangement according to the invention, the auxiliary gas stream which is caused to flow across the surface of the porous cathode member 18 along the gas flow channel 28 has a substantially different normal glow current density (defined as the ratio of the current per unit area to the square of the gas pressure, i.e., $J/p^2$) than that of the laser gas. In a preferred embodiment of the invention, the auxiliary gas is selected to provide a normal glow current density less than that of the laser gas. Specific exemplary gases having a low normal glow current density and which may be employed for the auxiliary gas are helium, argon, and neon. Helium is preferred, however, since it has the lowest normal glow current density (approximately 2 amps per cm$^2$ per Torr$^2 \times 10^{-6}$). This value of normal glow current density is at least an order of magnitude less than that of the specific exemplary laser gas mixture given above. It is further pointed out that in certain lasers where higher discharge current densities are required, such as pulsed lasers, the auxiliary gas may provide a normal glow current density higher that that of the laser gas, an exemplary auxiliary gas which usually would be appropriate for such a laser being nitrogen.

In the cathode arrangement shown in the FIGURE, a first quantity of the auxiliary gas passes through valve 60, passage 52, recess 46, apertured plate 68, and nozzle 66, and is introduced into the laser excitation region 12 just upstream from the upstream end of the cathode member 18. A second quantity of the auxiliary gas which travels via valve 62, passage 54, recess 48, and holes 36 in the plate-like portion 34, is "bled" through the porous cathode member 18 and gradually added to the auxiliary gas stream as it flows across the surface of the cathode member 18 along the channel portion 28. In a preferred embodiment of the invention, approximately half of the auxiliary gas may be introduced into the excitation region 12 upstream from the cathode member 18 and the other half introduced through the porous cathode member 18, although it should be understood that other relative amounts are also suitable and may be used instead. As a specific example for illustrative purposes, for a laser wherein the laser gas pressure within the excitation region 12 is approximately one atmosphere, the auxiliary gas pressure may be about 40 psi at the entrance side of each of the apertured plates 68 and 34.

In the aforedescribed arrangement, the substantially reduced normal glow current density provided by the auxiliary gas in the region 28 immediately adjacent to the cathode member 18 facilitates the achievement of a highly uniform electric discharge in the laser excitation region 12. This not only enables higher operating power levels to be achieved without degradation of the discharge uniformity and stability, but it also minimizes any tendency for spurious oscillations to occur due to "hot spots" in the discharge. In addition, since the auxiliary gas is replenished over the extent of the cathode member 18 in the gas flow direction, the effectiveness of the auxiliary gas stream in enhancing discharge uniformity is maintained throughout the laser excitation region 12. Further, the arrangement is insensitive to the length and velocity of the auxiliary gas stream, thereby minimizing design cost and complexity and maximizing operating reliability.

Although the present invention has been shown and described with reference to a particular embodiment, nevertheless, various changes and modifications which are obvious to a person skilled in the art to which the invention pertains are deemed to lie within the spirit, scope, and contemplation of the invention.

What is claimed is:

1. In an electrically excited laser wherein a working gas capable of being excited to a condition of population inversion is caused to flow through an excitation region from an upstream end to a downstream end, an electric discharge is established along a direction transverse to the direction of flow of said working gas between an anode and a cathode disposed on opposite sides of said excitation region, and an electron beam is introduced into said excitation region along a direction parallel to the direction of said discharge, the improvement comprising:

said cathode including a porous member of electrically conductive material having a surface facing said anode;

means for introducing first and second quantities of an auxiliary gas having a normal glow current density substantially different from that of said working gas into different portions of said excitation region, said first quantity being introduced into said upstream end at a location adjacent to said surface of said porous member and being directed into a flow path across said surface along a direction parallel to the flow direction of said working gas;

said second quantity being introduced into said flow path through said porous member such that it is gradually added to said first quantity of auxiliary gas flowing across said surface; and means coupled to said flow path at said downstream end of said excitation region for removing said auxiliary gas therefrom.

2. The improvement according to claim 1 wherein said auxiliary gas has a normal glow current density at least an order of magnitude less than that of said working gas.

3. The improvement according to claim 1 wherein said auxiliary gas is selected from the group consisting of helium, argon, and neon.

4. The improvement according to claim 1 wherein said working gas consists of a mixture of helium, nitrogen, and carbon dioxide, and said auxiliary gas consists of helium.

5. The improvement according to claim 1 wherein said first and second quanitites of said auxiliary are approximately equal to one another.

6. The improvement according to claim 1 wherein said means for removing said auxiliary gas includes a suction pump for drawing said auxiliary gas out of said excitation region at a mass flow rate substantially the same as that at which said auxiliary gas is introduced into said excitation region.

7. The improvement according to claim 1 wherein said porous member is mounted on a support member having a plate-like portion spaced from said porous member and disposed substantially parallel to said surface, said plate-like portion defining a plurality of holes therethrough, and said second quantity of said auxiliary gas being fed to said porous member through said holes.

8. In an electric discharge arrangement wherein a working gas capable of being excited to a condition of population inversion is caused to flow through an excitation region from an upstream end to a downstream end, an electric discharge is established along a direction transverse to the direction of flow of said working gas between an anode and a cathode disposed on opposite sides of said excitation region, and an electron beam is introduced into said excitation region along a direction parallel to the direction of said discharge, the improvement comprising:

said cathode including a porous member of electrically conductive material having a surface facing said anode;

means for introducing first and second quantities of an auxiliary gas having a normal glow current density substantially different from that of said working gas into different portions of said excitation region, said first quantity being introduced into said upstream end at a location adjacent to said surface of said porous member and being directed into a flow path across said surface along a direction parallel to the flow direction of said working gas, said second quantity being introduced into said flow path through said porous member such that it is gradually added to said first quantity of auxiliary gas flowing across said surface; and means coupled to said flow path at said downstream end of said excitation region for removing said auxiliary gas therefrom.

9. The improvement according to claim 8 wherein said auxiliary gas has a normal glow current density at least an order of magnitude less than that of said working gas.

10. The improvement according to claim 8 wherein said auxiliary gas is selected from the group consisting of helium, argon, and neon.

11. The improvement according to claim 8 wherein said working gas consists of a mixture of helium, nitrogen, and carbon dioxide, and said auxiliary gas consists of helium.

12. The improvement according to claim 8 wherein said first and second quantities of said auxiliary gas are approximately equal to one another.

13. The improvement according to claim 8 wherein said means for removing said auxiliary gas includes a suction pump for drawing said auxiliary gas out of said excitation region at a mass flow rate substantially the same as that at which said auxiliary gas is introduced into said excitation region.

14. The improvement according to claim 8 wherein said porous member is mounted on a support member having a plate-like portion spaced from said porous member and disposed substantially parallel to said surface, said plate-like portion defining a plurality of holes therethrough, and said second quantity of said auxiliary gas being fed to said porous member through said holes.

* * * * *